United States Patent [19]

McNemar

[11] Patent Number: 4,831,500
[45] Date of Patent: May 16, 1989

[54] ILLUMINATING DEVICE

[76] Inventor: Glenn A. McNemar, 2031 Hillside Dr., Falls Church, Va. 22042

[21] Appl. No.: 128,209

[22] Filed: Dec. 3, 1987

[51] Int. Cl.$^4$ .................. G01D 11/28; F21K 2/00
[52] U.S. Cl. ........................... 362/23; 362/34; 362/191; 362/430; 33/348
[58] Field of Search .................... 362/23, 27, 34, 191, 362/388, 396, 418, 430, 26, 28, 158, 29, 190; 33/348, 348.2; 73/299, 300

[56] References Cited

U.S. PATENT DOCUMENTS

| | | | |
|---|---|---|---|
| 1,873,684 | 8/1932 | Urfer | 33/348 |
| 2,221,152 | 11/1940 | Rylsky | 33/348.2 |
| 2,259,910 | 10/1941 | Rylsky | 362/26 |
| 2,270,163 | 1/1942 | Drodufsky et al. | 33/348.2 |
| 3,541,321 | 11/1970 | Spiteri | 362/418 X |
| 3,596,084 | 7/1971 | Henning | 362/396 |
| 4,429,350 | 1/1984 | Guthrie | 362/191 X |
| 4,503,563 | 3/1985 | Johnson | 362/158 X |
| 4,523,264 | 6/1985 | West | 362/396 |
| 4,581,683 | 4/1986 | Reiter et al. | 362/22 X |
| 4,772,986 | 9/1988 | McNemor | 362/23 |

Primary Examiner—Michael Koczo
Assistant Examiner—Peggy Neils
Attorney, Agent, or Firm—Diller, Ramik & Wight

[57] ABSTRACT

An illuminating device to be used in association with an instrument to facilitate reading indicia thereon in low light/dark conditions. The device can be attached to a single instrument or a combination of consolidated instruments-gauges. The illuminating device is normally attached to an associated instrument in a generally overlaying relationship to the instrument face; and can be used universally with instruments of different sizes and configurations within various classes of instruments.

40 Claims, 3 Drawing Sheets

ILLUMINATING DEVICE

THE BACKGROUND OF THE INVENTION

This invention relates generally to devices for illuminating otherwise nonilluminated instruments and gauges, and more particularly to an illuminating device having means for externally illuminating otherwise conventional instruments and also having universal qualities which enable the device to be fitted on different size instruments within various classes of instruments.

The illumination device herein disclosed is primarily designed for use in association with otherwise conventional scuba diving instruments that may include timers, compasses, depth and pressure gauges, thermometers, digital electronic instrumentation and any combination of these. However, the invention is not to be deemed as being limited solely to the applications just described.

Many compact, hand-held instruments are difficult to read in low light and dark conditions particularly those used in scuba diving. Instruments used in scuba diving give information of paramount importance to the diver. Divers must monitor these instruments many times throughout the course of a dive, in order to keep the dive within its limits. Therefore, a diver should be able to read an instrument with just a glance, but this is not always possible. While diving in low light and dark conditions scuba diving instruments are extremely difficult to read. In fact, many of the advanced digital instruments with liquid crystal displays, LCDs, are even difficult to read while using a hand held diver's light. These LCD instruments require a certain lighting angle. Achieving this angle of illumination is usually inconvenient for the diver.

Diving in low light or dark conditions is not uncommon. In fact, diving in the oceans at night is very popular. Night diving gives the diver the opportunity to observe nocturnal creatures. Additionally, divers frequent underwater caves, caverns and ship wrecks all of which provide extremely dark conditions if penetrated or if the dive is made during the night time. While diving in such conditions, divers carry special lights. These lights are designed and adapted for use underwater and they sufficiently illuminate the divers surroundings. Even though it is common practice for a diver to illuminate the instrumentation with this source of external lighting, it is not always effective and convenient.

Scuba divers rely on their instrumentation to monitor the state of the dive. When a diver makes a descent the depth gauge and timer can be used to calculate the rate of descent. The depth gauge will tell the diver when the maximum desired depth has been reached. Once at depth, the diver may require the use of a compass to navigate. The pressure gauge gives the diver an indication of how much available air remains in the scuba tank throughout the course of a dive. The timer is important because time and depth must be interrelated to calculate decompression status. Finally, a diver must ascend from depth and this requires the diver to ascend at a proper rate to avoid possible lung overexpansion injuries. By monitoring the depth gauge and timer (or perhaps one of todays sophisticated dive computers) the rate of ascent can be calculated. The diver typically monitors the instrumentation with a single hand held console which may house all of the instruments. The console is normally attached to the high pressure hose in order to include the pressure gauge. The high pressure hose runs from the scuba tank to the divers console.

Modern technology permits internal lighting to be incorporated with digital electronics. This is exemplified by the lighting features found in digital watches. Internal lighting features in diving instruments would not be desirable. LCDs found on diving instruments are sometimes much larger than the display of a watch; a light source that would illuminate this increased display size would have to be relatively powerful, causing a shortened battery life. Furthermore, many diving instruments contain extreme long life batteries that are permanently sealed into the instrument casing. This is done to maintain the water tight and pressure proof integrity of the instrument and reduce maintenance. Because the additional electrical draw of an internal light would prematurely deplete the actual life of the instrument, internal lighting would be undesirable. Some of the modern digital instruments will allow the user to replace the batteries. This feature is offered in certain instruments because they are intended to be turned on and remain on for extended periods of time. An internal light in this type of instrument would be more possible, because of the increased surplus of electrical power, but still would be undesirable because battery change intervals would be increased. Every time a battery change is made a battery compartment must be opened, and before it is reclosed the seals and sealing surfaces must be maintenanced. The increased battery change and maintenance requirements are not desirable. Furthermore, it is well known that if a seal worked for a previous dive the seal will work for the second dive, if the seal has not been tampered.

There are many different types of compact hand held instruments within the scuba diving class of instruments. Divers use different instruments to fulfill their individual needs and requirements. The fact that these instruments must be illuminated has been established, and since it would be undesirable to illuminate them internally, a redundant external means would be most desirable. Redundant external illumination can be accomplished through the use of a specially adapted iluminating device. Since these instruments are embodied in a wide variety of sizes and configurations, a universal illuminating device which can be readily fitted to these different instruments without modification would be most beneficial.

DESCRIPTION OF THE PRIOR ART

The prior art includes a device called Combo-lites, a trademark of Tekna located at 101 Twin Dolphin Dr., Redwood City, Calif. 94065. This device is a removeable bracket which houses a single miniature chemical light stick. The Combo-Lite is fastened to a Combo-Gauge (Also a trademark of Tekna) between its two primary gauges. When the Combo-Lite is activated light emitted from the chemical light stick will partially illuminate the depth and pressure gauges of a Combo-Gauge.

A Combo-Gauge is a combination of two or more scuba diving gauges consolidated within a plastic console. The console allows the gauges to be contained within, and arranged in an in-line order. A typical Combo-Gauge may include a compass, depth gauge and a pressure gauge on one side and a timer and knife with sheath on the other. A Combo-Gauge enables a diver to monitor all of these instruments, with a single hand held unit.

There are deficiencies in the design and actual functional abilities of the Combo-Lite. Primarily, the Combo-Lite depends on a single miniature chemical light stick to illuminate the gauges. The limited light supply from a single miniature chemical light stick is insufficient to accomplish this. In addition the Combo-Lite does not have adequate means to effectively reflect and direct light. The high profile of a Combo-Lite is undesirable. The Combo-Lite can be broken off because of a jolt or possibly be inadvertently removed by becoming hooked on an object. In addition a Combo-Lite by design can not be fitted to any other instruments except the Combo-Gauge.

Combo-Gauges have been in existence for sometime before the introduction of Combo-Lites. Since the introduction of Combo-Lites, Combo-Gauges can be purchased with a Combo-Lite. Old pre-Combo-Lite Combo-Gauges can be retrofitted to accept the Combo-Lite but this procedure requires the Combo-Gauge to be modified.

SUMMARY OF THE INVENTION

In keeping with the foregoing, a primary object of this invention is to avoid the latter noted deficiencies in prior art devices by providing an illuminating device which is characterized by a frame adapted to hold two chemical light sticks, and position them in such a way to fully illuminate an associated instrument face.

It is an object of this invention to provide an illuminating device which has means to direct light inwardly and downwardly relative to the associated instrument face while confining and reflecting spurious light to the instrument face.

It is another object of this invention to provide an illuminating device that can be readily attached to a conventional instrument and removed without tools or modifications to the instrument or the illuminating device.

It is another object of this invention to provide an illuminating device which can be used in association with scuba diving instruments and thereby be resistant to the elements of scuba diving.

It is still another object of this invention to provide an illuminating device that can be readily adapted to fit different size instruments within various classes of instruments without modification.

It is a further object of this invention to provide an illuminating device that can be in the form of a two part, unitary molding of relatively light weight material or machined from the same.

It is still a further object of this invention to provide an illuminating device which has a relatively light weight and low profile.

It is still one more object of this invention to provide an illuminating device which has means to securely hold the illuminescent material.

It is still one further object of this invention to provide an illuminating device which has means to remove the illuminescent material.

Further novel features and other objects and advantages of this invention will become apparent from the following detailed description, discussion and the claims taken in conjunction with the accompanying drawings.

BRIEF DESCRIPTION OF THE DRAWINGS

A preferred embodiment of the illuminating device of this invention is disclosed in the accompanying drawings in which.

DETAILED DESCRIPTION OF THE PREFERRED EMBODIMENT

Figure 1:
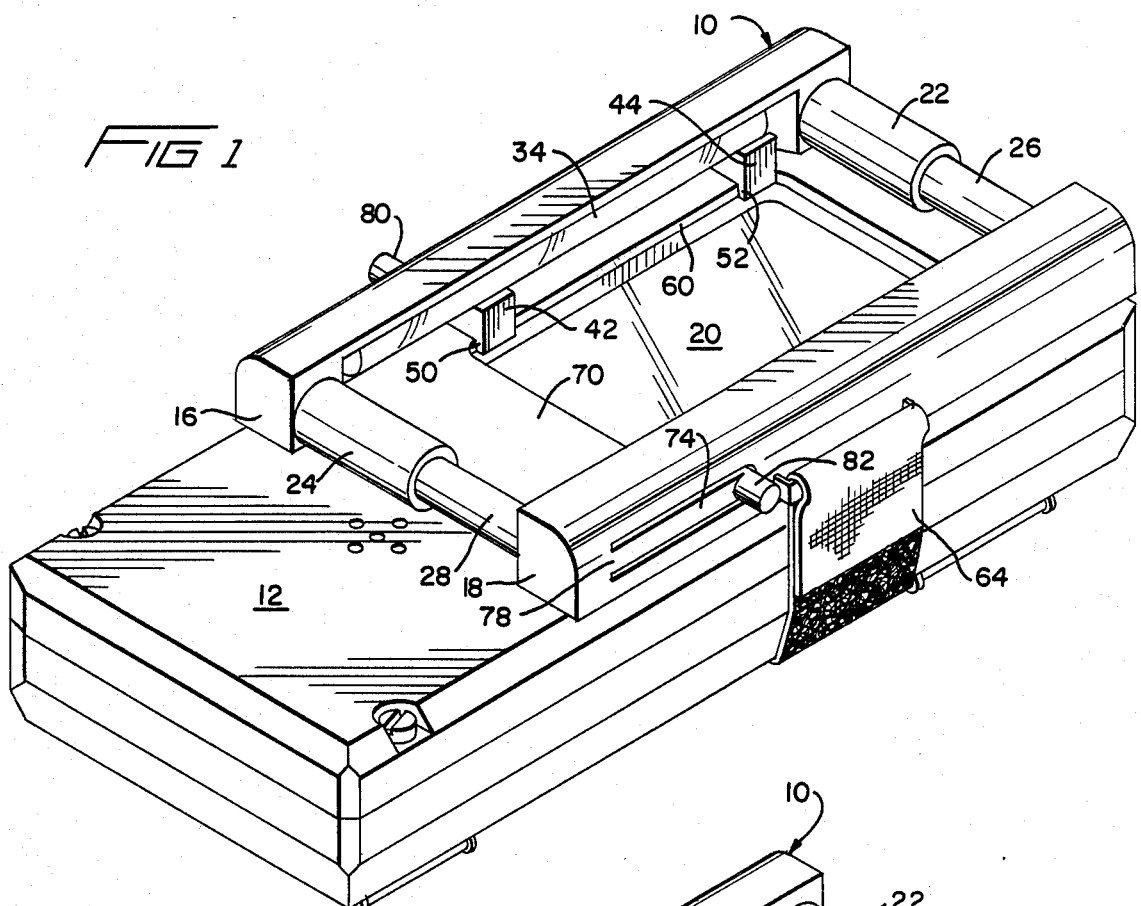
FIG. 1 is a perspective view of the illuminating device, and illustrates the illuminating device attached to a scuba diving instrument by a strap.
Figure 2:
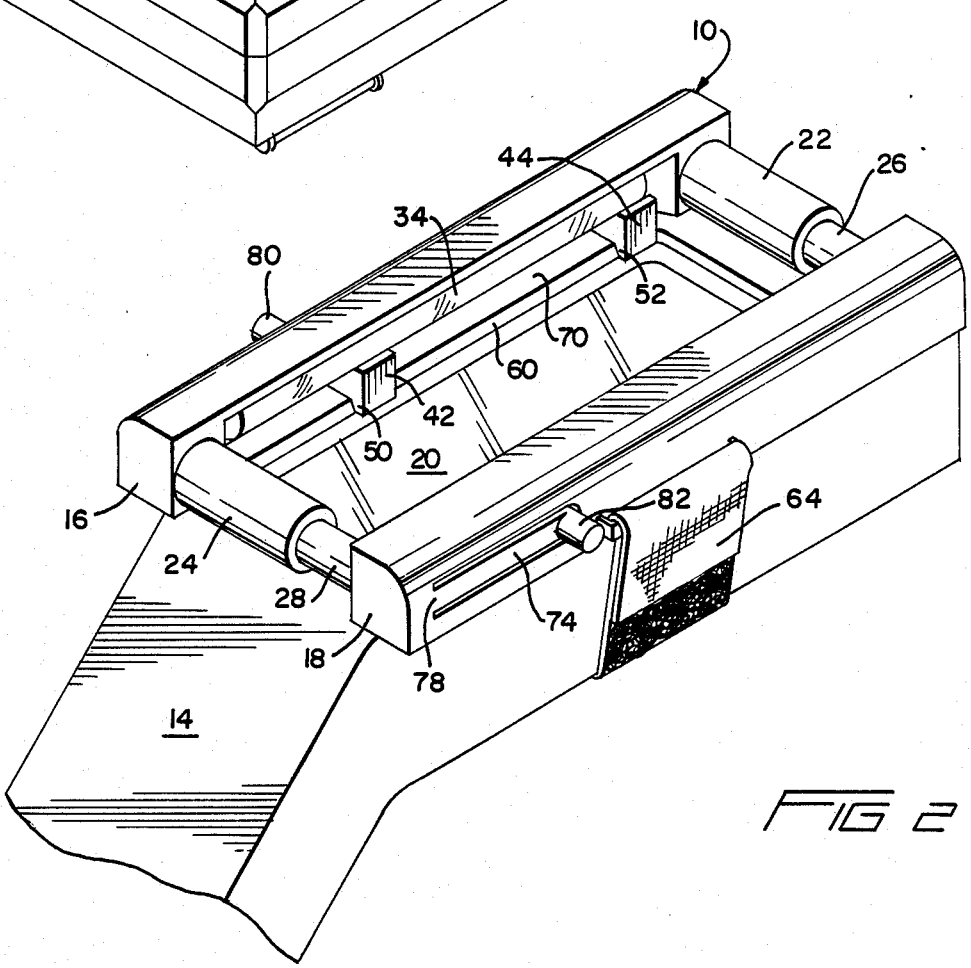
FIG. 2 is a perspective view of the illuminating device, and illustrates the illuminating device attached to a scuba diving instrument of a different size and configuration than the instrument shown in FIG. 1.

Referring now to the drawings by reference characters and in particular to FIGS. 1 and 2, a novel illuminating device 10 is attached to two different scuba diving instruments 12, 14. The illuminating device 10 is defined by a frame 11 including two frame portions 16,18. These frame portions 16,18 may be in the form of a single, unitary injection molding of relatively rigid rubber, plastics, or other material. The material is relatively rigid so the frame portions 16, 18 will maintain a certain contour and shape that corresponds to an associated recessed instrument face or recessed instrument face area 20 of the instruments 12,14. A relatively rigid material is also desirable for maintaining structural integrity of female and male telescopic connectors 22,24 and 26,28, respectively, to insure ease of adjustment.

Figure 4:
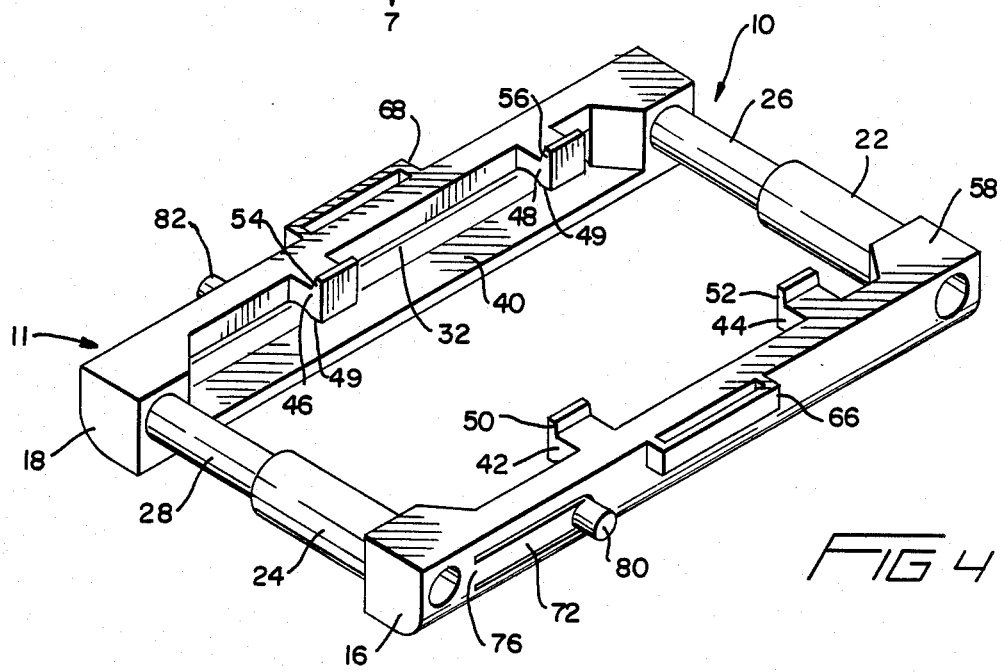
FIG. 4 is a bottom perspective view of the illuminating device, the strap is removed for clarity, and illustrates two pairs of tabs for securing the frame to scuba diving instruments of different sizes.
Figure 5:
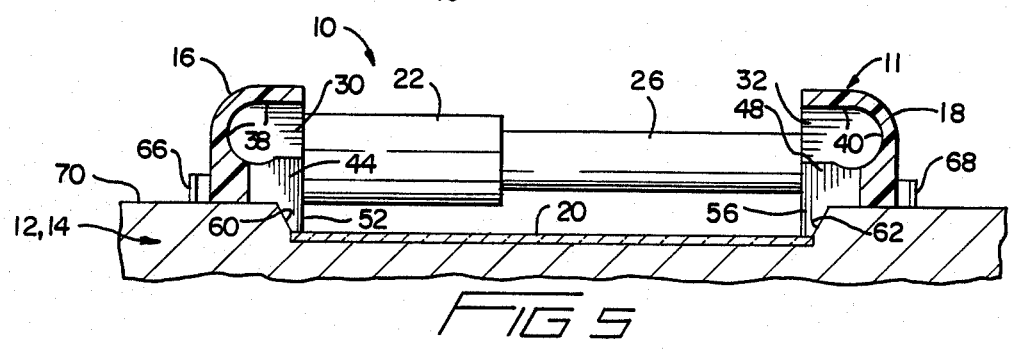
FIG. 5 is an enlarged cross sectional view of the illuminating device taken along the lines 5—5 of FIG. 3, and illustrates a chemical light stick chamber of each frame portion.

The frame portions 16,18 include an elongated chemical light stick chamber 30,32, respectively, which carries a generally cylindrical cyalume chemical light stick 34,36. (See FIGS. 1, 2, 3, and 6). The elongated chambers 30,32 include a generally curved upper chamber surface 38,40, respectively, shown in FIGS. 4, 5, to reflect light inwardly and downwardly relative to the associated instrument face 20. The light so reflected is created by the two chemical light sticks 34,36 (See FIGS. 3, 4, and 5) which are first activated by bending each light stick 34,36 which permits two contained chemicals to mix, thereby producing light for about six (6) hours. After the light sticks 34,36 have been activated, they are inserted into the elongated chambers 30,32 (See FIGS. 1, 2 and 3) to provide a source of illumination that once combined with the illuminating device 10 will fully illuminate the associated instrument face 20. The frame portions 16,18 adjacent the elongated chambers 30, 32 include a pair of retaining clips 42,44 and 46,48, respectively, for retaining the chemical light sticks 34,36 within the elongated chambers 30,32 (See FIGS. 3, 4, and 5). The retaining clips 42,44, and 46,48 are provided with a slight lobe 49 at the outermost, chamber side portion of each clip 42,44,46 and 48 to securely retain the cylindrical chemical light sticks 34,36 in the respective chambers 30,32. FIGS. 1 and 2 clearly illustrate a chemical light stick 34,36 inserted into their respective elongated chambers 30,32 and retained therein by the respective retaining clips 42, 44 and the lobes 49 thereof. The retaining clips 42,44, and 46,48 also include a tab 50,52, and 54,56, respectively, which extends beyond a bottom surface 58 of the illuminating device 10. The tabs 50,52 and 54,56 abuttingly engage with first and second adjacent edges 60,62 of the recessed instrument face area 20 as is best illustrated in FIGS. 5 and 6.

The telescopic connectors 22,26 and 24,28 of the illuminating device 10 collectively define means 90,92, respectively, for selectively varying the distance D1 (See FIG. 6) between the frame portions 16,18. By selectively varying the distance D1 between the frame portions 16,18 until the tabs 50,52 and 54,56 intimately and abuttingly engage the first and second adjacent edges 60,62 (FIG. 5) of the recessed instrument face area 20, the illuminating device 10 can be infinitely adjusted to accomodate instrument faces 20 of different widths W within the range of the telescopic connectors 22,26 and 24,28.

Figure 6:
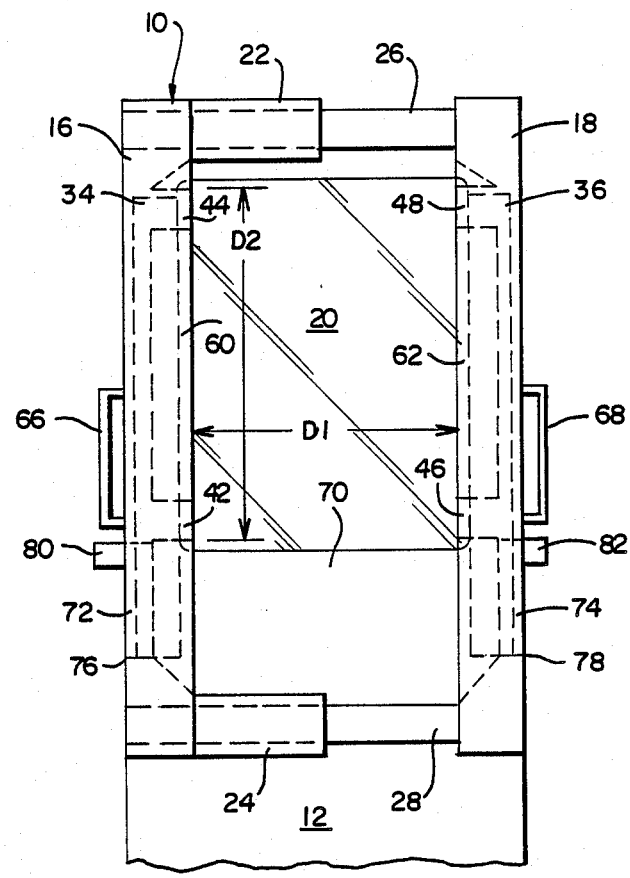
FIG. 6 is a fragmentary top schematic view, and illustrates the illuminating device in place on the scuba diving instrument of FIG. 1.

The female and male telescopic connectors 22,24 and 26,28, respectively, are perpendicularly carried by their respective frame portions 16,18; and are generally spaced parallel to each other a distance D3 of FIG. 6, which positions the telescopic connectors 22,26 and 24,28 into the end periphery of the longest known instrument face 20 within the class of known scuba diving instruments. These spatial configurations permit the illuminating device 10 to be unobstructive to the view of the instrument face 20 when used with long faced instruments (Shown in FIG. 2).

Figure 3:
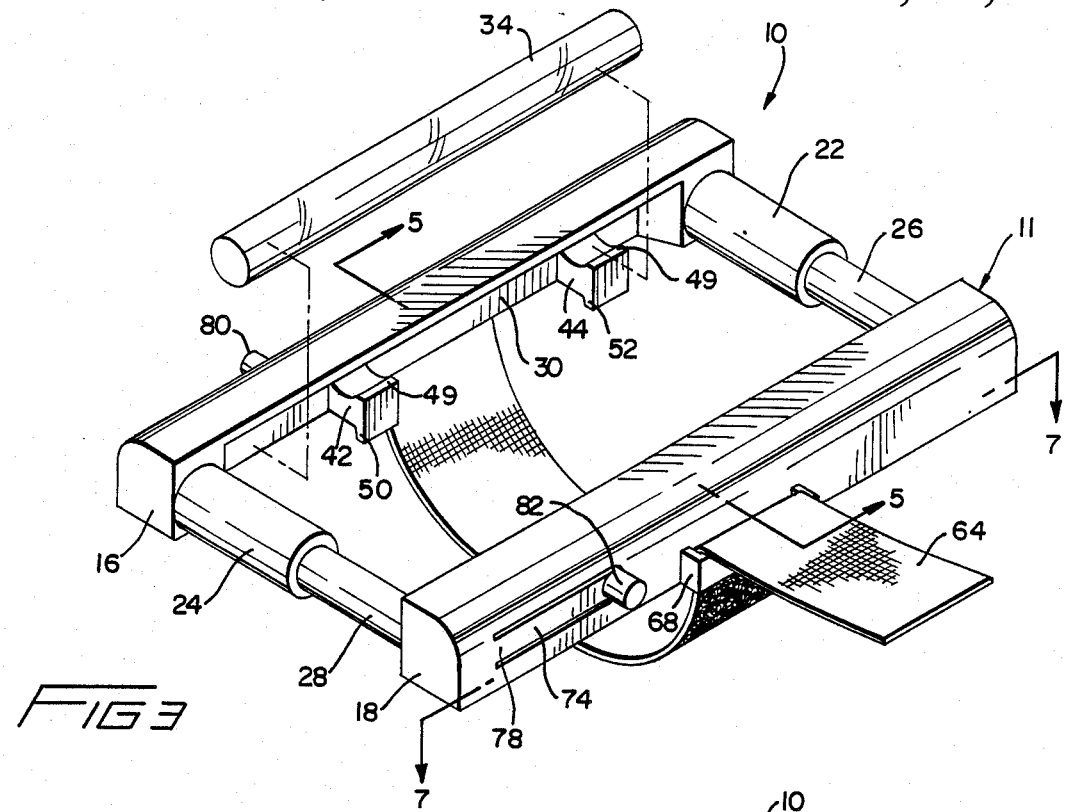
FIG. 3 is an exploded perspective view of the illuminating device, and illustrates one of a pair of chemical light sticks prior to being inserted in one of a pair of frame portions of an adjustable frame.

A Velcro strap 64 is used to secure the illuminating device 10 to the associated instrument 12,14. The Velcro strap 64 is affixed to the illuminating device 10 by attaching the loops end (unnumbered) of the Velcro to a strap loop or guide 66. The hooks end (also unnumbered) of the Velcro is loose and can freely slip through a second strap loop or guide 68 and is folded over to secure it to the loops end of the strap 64, as is shown in FIGS. 1,2 and 3.

The Velcro strap 64 applies a force to each of the frame portions 16,18 tending to move the frame portions 16,18 away from each other thereby allowing the tabs 50,52 and 54,56 to intimately and abuttingly engage the respective first and second adjacent edges 60, 62 (See FIG. 5) of the recessed instrument face area 20, and thereby limit further separation of the frame portions 16,18. The Velcro strap 64 also holds the illuminating device 10 firmly against a top surface 70 of the associated instrument 12,14 (See FIG. 5), thereby maintaining the engagement of the tabs 50,52 and 54,56 down inside the recessed instrument face area 20. The engagement of the tabs 50,52 and 54,56 down inside the recessed instrument area 20 prevents the illuminating device 10 from slipping off of the associated instrument 12,14. The elongated chambers 30,32 are thus positioned to optimally expose the instrument face 20 to light produced by and eminating from the chemical light sticks 34,36 and also maximize the exposed area of the instrument face 20.

The tabs 50,52 and 54,56 are spaced from each other by a maximum distance D2 ( FIG.6) that will permit engagement of the tabs 50,52 and 54,56 into the shortest known recessed instrument face area 20, within the class of known scuba diving instruments. Additionally the two pairs of tabs 50,52 and 54,56 are offset from a transverse center line CL of the illuminating device 10 to allow the extra length of the frame portions 16,18 to extend over the instrument 12, when used in conjunction with short faced instruments (Shown in FIGS. 1 and 6).

Figure 7:
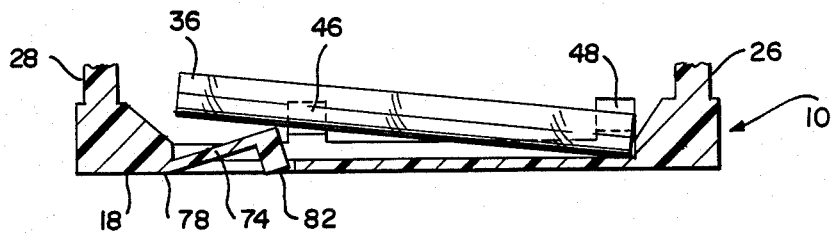
FIG. 7 is a cross sectional view of one of the frame portions taken along the lines 7—7 in FIG. 3, and illustrates a chemical light stick as it is being ejected.

Each of the elongated chambers 30,32 has a resilient ejector tab 72,74 (FIGS. 4 and 3 respectively) to aid in the removal of spent chemical light sticks 34,36. The ejector tabs 72,74 are formed as deflectable wall portions of the elongated chambers 30,32 and are configured with respective hinged ends 76,78 and outwardly facing buttons 80,82 at opposite free ends (unnumbered) of the ejector tabs 72,74. The buttons 80,82 can be pushed inward, thereby pushing an end of the associated chemical light stick 34,36 over the associated lobe 49 of the respective retaining clips 42,46, as is clearly illustrated in FIG. 7. Once the chemical light stick 36 is in the position shown in FIG. 7, or the like positioned unillustrated CLS 34, it can be easily removed.

In order to mount the illuminating device 10 to an associated instrument 12,14, the illuminating device 10 is first placed over the instrument face 20 with the frame portions 16,18 as close to each other as is possible. The frame portions 16,18 must then be pulled apart until the tabs 50,52 and 54,56 abuttingly engage the respective instrument edges 60,62. The strap 64 is then wrapped around the associated instrument 12,14 and snugly secured to the strap giude 68. Obviously, the strap 64 applies oppositely directed forces F,F to the frame portions 16,18 to forcefully maintain the tabs 50,52 and 54,56 in abutting and secured relationship to the instrument edges 60,62.

The invention may be embodied in other specific forms without departing from the spirit or essential characteristics thereof. The present embodiment is therefore to be considered in all aspects as illustrative and not restrictive, the scope of the invention being indicated by the claims rather than by the foregoing description and all changes which come within the meaning and range of equivalency of the claims are therefore intended to be embraced therein.

I claim:

1. An illuminating device for illuminating the face of a diving instrument to facilitate reading indicia thereon particularly under water, the illuminating device comprising a frame, said frame including first and second frame portions for positioning adjacent respective first and second edges of an associated diving instrument face, at least one of said frame portions having means for carrying illuminescent material for illuminating the associated diving instrument face under water, means for securing said frame to an associated diving instrument, and means for selectively varying the distance between said first and second frame portions to accommodate said device to diving instruments having faces of different sizes.

2. The illuminating device as defined in claim 1 wherein said varying means includes first and second connectors carried by said respective first and second frame portions, and said first and second connectors include respective first and second means for selectively varying the total effective length of said first and second connectors.

3. The illuminating device as defined in claim 1 wherein another of said frame portions has means for carrying illuminescent material whereby the associated instrument face can be further illuminated.

4. The illuminating device as defined in claim 1 including means for facilitating the removal of illuminescent material from said illuminescent material carrying means.

5. The illuminating device as defined in claim 1 wherein said first and second frame portions are disposed in generally parallel relationship to each other.

6. The illuminating device as defined in claim 1 wherein said illuminescent material carrying means includes a flexible clip.

7. The illuminating device as defined in claim 1 wherein said illuminescent material carrying means includes an elongated chamber in said one frame portion and a flexible clip for retaining the illuminescent material in said elongated chamber.

8. The illuminating device as defined in claim 1 wherein at least one of said frame portions includes means for abuttingly engaging an associated one of first and second instrument edges adjacent the instrument face, and said frame securing means holds said engaging means in abutting engagement with the one instrument edge.

9. The illuminating device as defined in claim 1 wherein said varying means includes first and second connectors carried by said respective first and second frame portions, said first and second connectors include respective first and second means for selectively varying the total effective length said first and second connectors, and said last-mentioned means is a slidable connection between said first and second connectors.

10. The illuminating device as defined in claim 1 wherein said varying means includes first and second connectors carried by said respective first and second frame portions, said first and second connectors include respective first and second means for selectively varying the total effective length said first and second connectors, and said last-mentioned means is a telescopic connection between said first and second connectors.

11. The illuminating device as defined in claim 1 wherein said first and second frame portions include respective first and second means for abuttingly engaging respective first and second instrument edges adjacent respective first and second instrument face edges thereby limiting the distance between said first and second frame portions relative to an associated instrument.

12. The illuminating device as defined in claim 1 wherein said first and second frame portions include respective first and second means for abuttingly engaging respective first and second instrument edges adjacent respective first and second instrument face edges thereby limiting the distance between said first and second frame portions relative to an associated instrument, and said securing means apply a force to said frame portions tending to move the frame portions away from each other whereby said first and second abutting means intimately abuttingly engage the respective first and second instrument edges.

13. The illuminating device as defined in claim 1 wherein said varying means includes first and second spaced pairs of first and second connectors, the first and second connectors of said pairs being carried by said respective first and second frame portions, and each associated first and second connector include respective first and second means for selectively varying the total effective length of the first and second connectors of each pair.

14. The illuminating device as defined in claim 1 wherein said varying means includes first and second spaced pairs of first and second connectors, the first and second connectors of said pairs being carried by said respective first and second frame portions, each associated first and second connector include respective first and second means for selectively varying the total effective length of the first and second connectors of each pair, and said pairs are disposed in generally parallel relationship to each other and generally transverse to said frame portions.

15. The illuminating device as defined in claim 14 wherein another of said frame portions has means for carrying illuminescent material whereby the associated instrument face can be further illuminated.

16. The illuminating device as defined in claim 14 including means for facilitating the removal of illuminescent material from said illuminescent material carrying means.

17. The illuminating device as defined in claim 14 wherein said first and second frame portions are disposed in generally parallel relationship to each other.

18. The illuminating device as defined in claim 14 wherein said illuminescent material carrying means includes a flexible clip.

19. The illuminating device as defined in claim 14 wherein said illuminescent material carrying means includes an elongated chamber in said one frame portion and a flexible clip for retaining the illuminescent material in said elongated chamber.

20. The illuminating device as defined in claim 14 wherein said first and second frame portions include respective first and second means for abuttingly engaging respective first and second instrument edges adjacent respective first and second instrument face edges thereby limiting the distance between said first and second frame portions relative to an associated instrument.

21. The combination of an instrument adapted for use under water and a device for illuminating the instrument comprising an underwater instrument including adjacent first and second edges and a face therebetween having indicia thereon, an illuminating device comprising a frame, said frame including first and second frame portions positioned adjacent said first and second instrument edges, at least one of said frame portions having means for carrying illuminescent material whereby said instrument face can be illuminated under water, means for securing said frame to said underwater instrument, and means for selectively varying the distance between said first and second frame portions to thereby accommodate said device to underwater instruments having faces of different sizes.

22. The combination as defined in claim 21 wherein said varying means includes first and second connectors carried by said respective first and second frame portions, and said first and second connectors include respective first and second means for selectively varying the total effective length of said first and second connectors.

23. The combination as defined in claim 21 wherein another of said frame portions has means for carrying illuminescent material whereby said instrument face can be further illuminated.

24. The combination as defined in claim 21 including means for facilitating the removal of illuminescent material from said illuminescent material carrying means.

25. The combination as defined in claim 21 wherein said first and second frame portions are disposed in generally parallel relationship to each other.

26. The combination as defined in claim 21 wherein said illuminescent material carrying means includes a flexible clip.

27. The combination as defined in claim 21 wherein said illuminescent material carrying means includes an elongated chamber in said one frame portion and a flexible clip for retaining the illuminescent material in said elongated chamber.

28. The combination as defined in claim 21 wherein at least one of said frame portions includes means for abuttingly engaging one of said first and second instrument edge adjacent said instrument face, and said frame securing means holds said engaging means in abutting engagement with said one instrument edge.

29. The combination as defined in claim 21 wherein said varying means includes first and second connectors carried by said respective first and second frame portions, said first and second connectors include respective first and second means for selectively varying the total effective length said first and second connectors, and said last-mentioned means is a slidable connection between said first and second connectors.

30. The combination as defined in claim 21 wherein said varying means includes first and second connectors carried by said respective first and second frame portions, said first and second connectors include respective first and second means for selectively varying the total effective length said first and second connectors, and said last-mentioned means is a telescopic connection between said first and second connectors.

31. The combination as defined in claim 21 wherein said first and second frame portions include respective first and second means for abuttingly engaging said first and second instrument edges adjacent respective first and second instruments face edges thereby limiting the distance between said first and second frame portions relative to said instrument.

32. The combination as defined in claim 21 wherein said first and second frame portions include respective first and second means for abuttingly engaging said first and second instrument edges adjacent respective first and second instrument face edges thereby limiting the distance between said first and second frame portions relative to said instrument, and said securing means apply a force to said frame portions tending to move the frame portions away from each other whereby said first and second abutting means intimately abuttingly engage the respective first and second instrument edges.

33. The combination as defined in claim 21 wherein said varying means includes first and second spaced pairs of first and second connectors, the first and second connectors of said pairs being carried by said respective first and second frame portions, and each associated first and second connector include respective first and second means for selectively varying the total effective length of the first and second connectors of each pair.

34. The combination as defined in claim 21 wherein said varying means includes first and second spaced pairs of first and second connectors, the first and second connectors of said pairs being carried by said respective first and second frame portions, each associated first and second connector include respective first and second means for selectively varying the total effective length of the first and second connectors of each pair, and said pairs are disposed in generally parallel relationship to each other and generally transverse to said frame portions.

35. The combination as defined in claim 34 wherein another of said frame portions has means for carrying illuminescent material whereby said instrument face can be further illuminated.

36. The combination as defined in claim 34 including means for facilitating the removal of illuminescent material from said illuminescent material carrying means.

37. The combination as defined in claim 34 wherein said first and second frame portions are disposed in generally parallel relationship to each other.

38. The combination as defined in claim 34 wherein said illuminescent material carrying means includes a flexible clip.

39. The combination as defined in claim 34 wherein said illuminescent material carrying means includes an elongated chamber in said one frame portion and a flexible clip for retaining the illuminescent material in said elongated chamber.

40. The combination as defined in claim 34 wherein said first and second frame portions include respective first and second means for abuttingly engaging said first and second instrument edges adjacent respective first and second instrument face edges thereby limiting the distance between said first and second frame portions relative to said instrument.

* * * * *